Patented Nov. 17, 1931

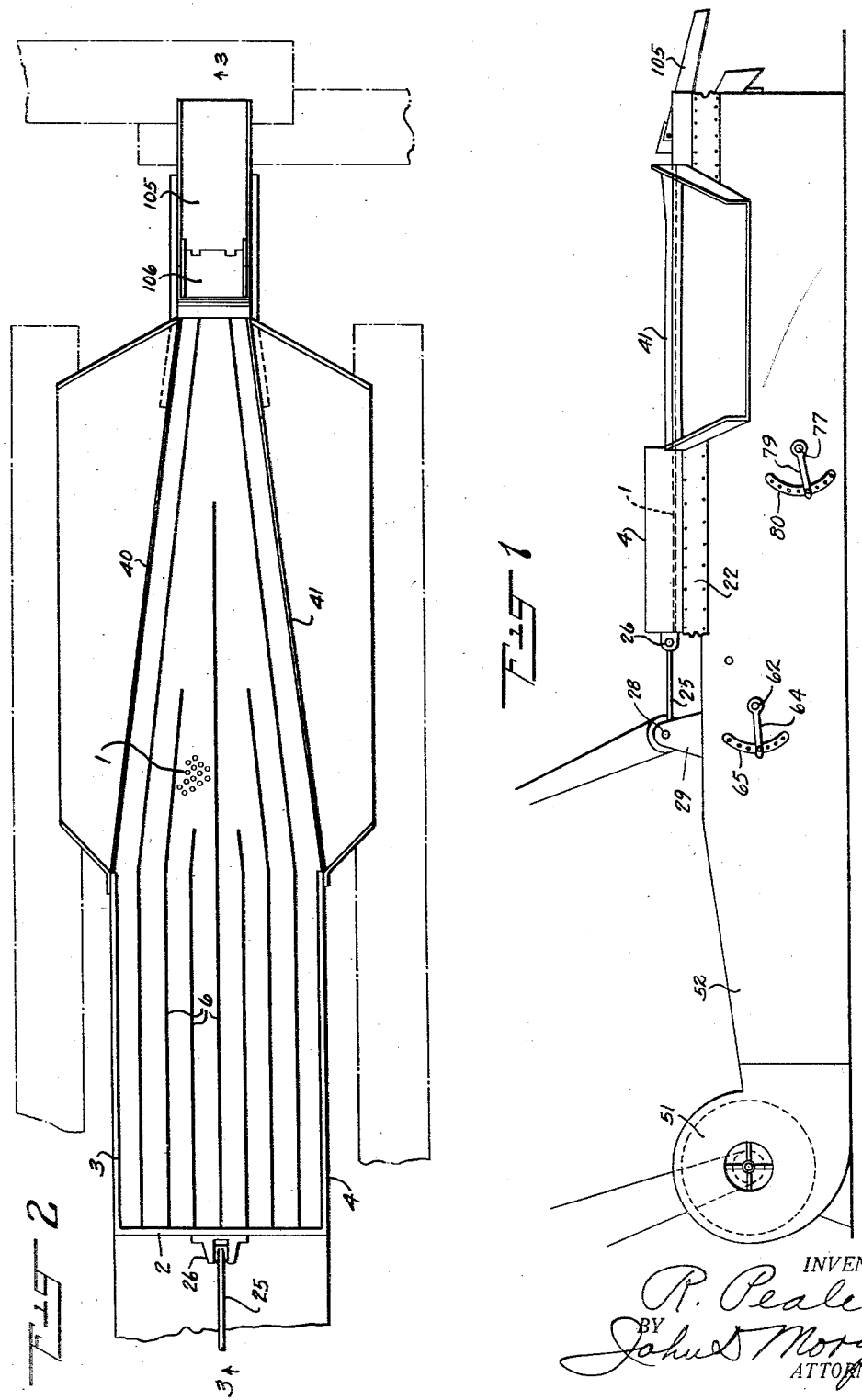

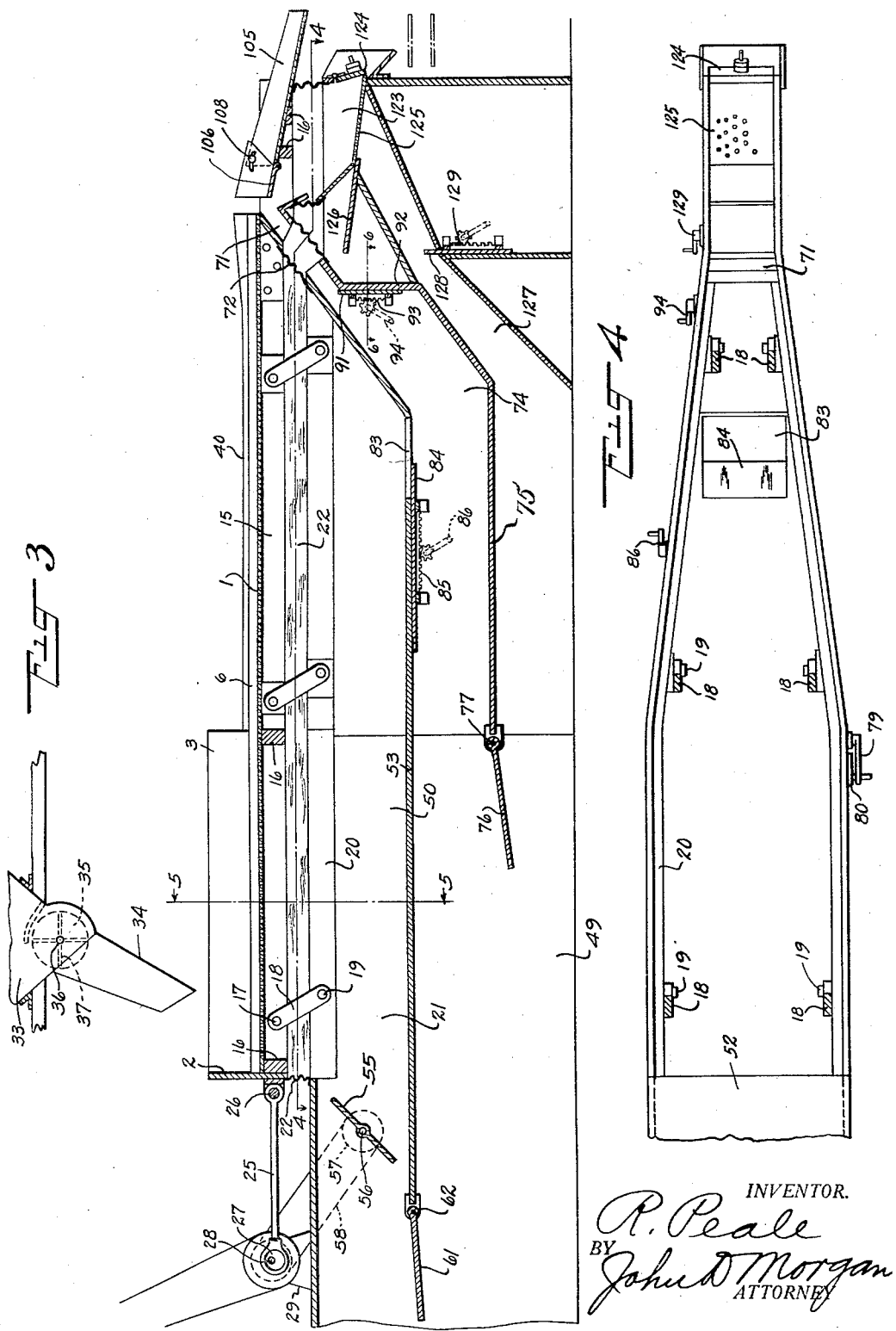

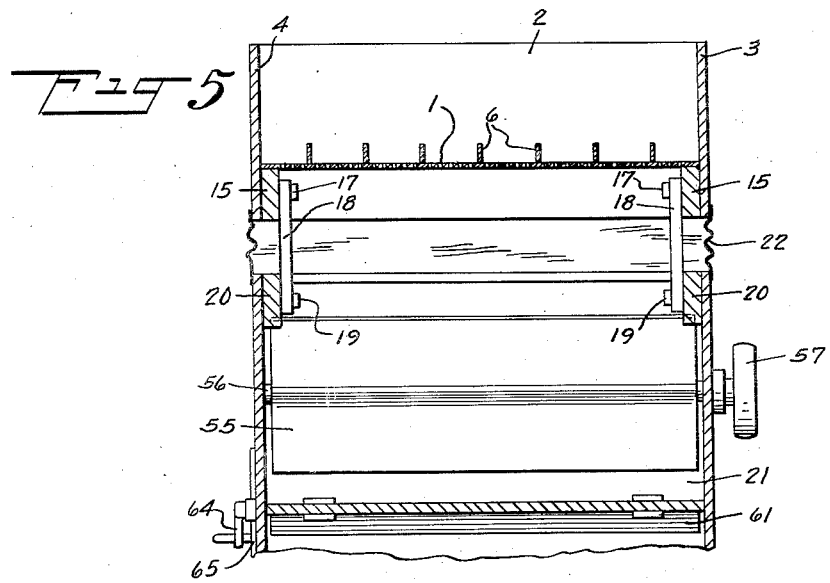
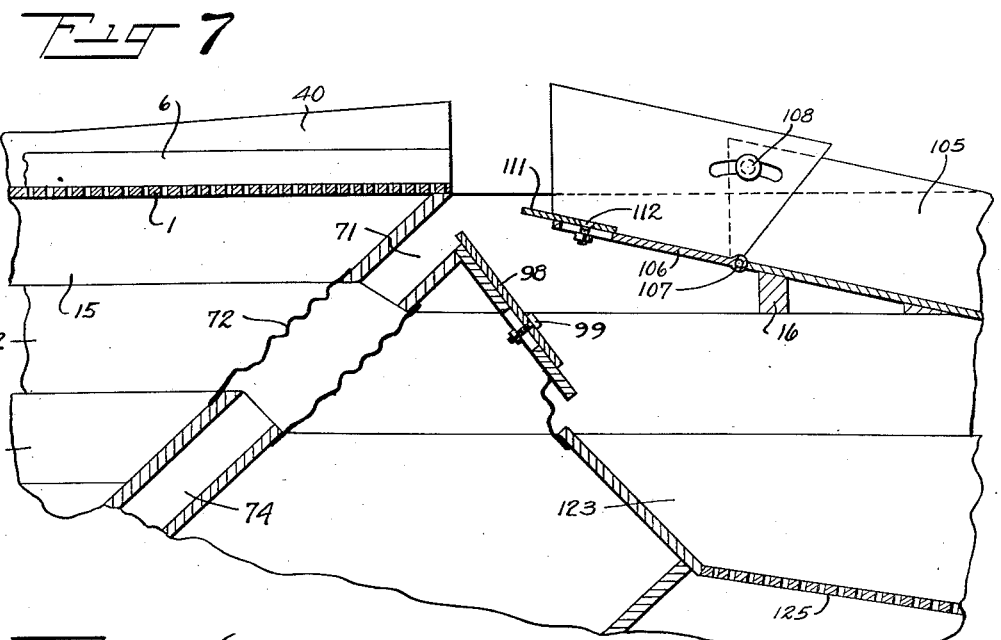
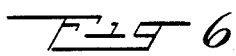

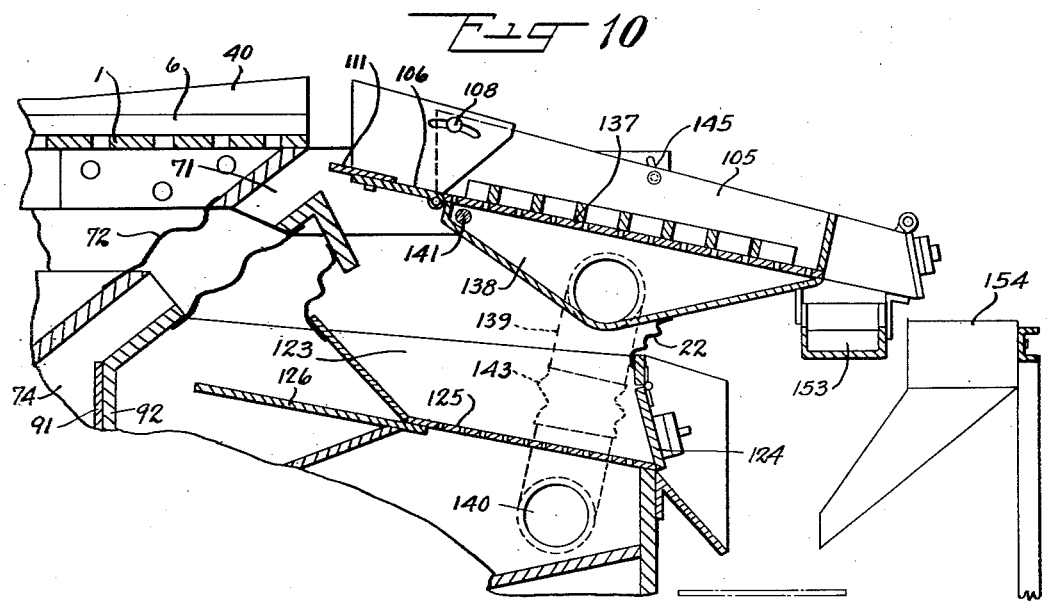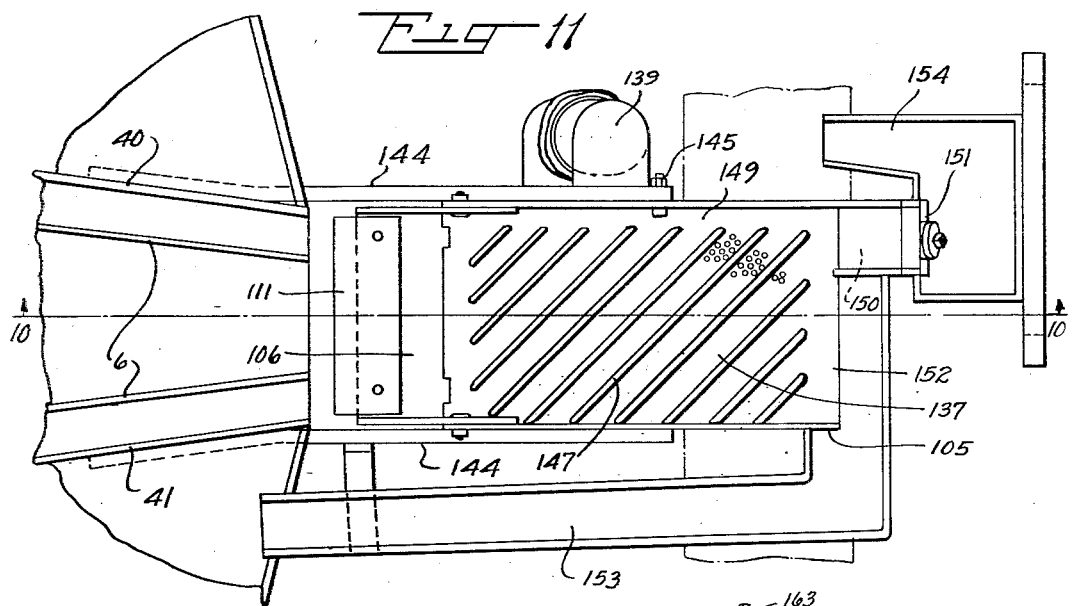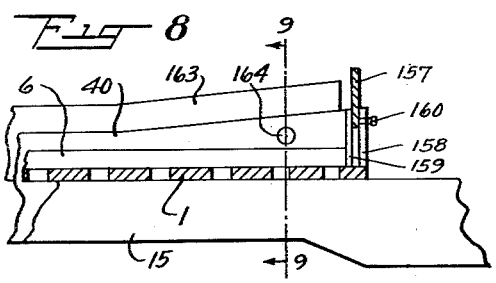

1,832,048

REISSUED

UNITED STATES PATENT OFFICE

RICHARD PEALE, OF ST. BENEDICT, PENNSYLVANIA, ASSIGNOR, BY MESNE ASSIGNMENTS, TO PEALE-DAVIS COMPANY, OF WILMINGTON, DELAWARE, A CORPORATION OF DELAWARE

PROCESS AND MECHANISM FOR SEPARATING INTERMIXED DIVIDED MATERIALS

Application filed May 2, 1928. Serial No. 274,446.

The invention relates to a process and mechanism for separating intermixed divided materials wherein the particles vary relatively very greatly in size, but vary relatively little in their specific gravities, and more particularly to such a process and mechanism wherein separation of the material is effected approximately completely as regards the free impurities.

Objects and advantages of the invention are set forth in part hereinafter, and in part are obvious herefrom, or may be learned by practicing the invention; the same being realized and attained through the processes and instrumentalities pointed out in the appended claims.

The invention consists of the novel steps, processes, parts, combinations, constructions, arrangements and improvements herein disclosed.

The accompanying drawings, herein referred to and constituting a part hereof, illustrate a mechanism embodying the invention, and exemplifying the practicing of the process included in said invention; said drawings, together with the description, serving to illustrate the principles of the invention and to exemplify the practical application thereof.

Of the drawings:

Fig. 1 is a side elevation of a mechanism embodying the invention;

Fig. 2 is a top plan, on an enlarged scale, corresponding to Fig. 1 with the left-hand end omitted;

Fig. 3 is a central, vertical, longitudinal section taken on the line 3—3 of Fig. 2;

Fig. 4 is a full horizontal section, taken substantially on the line 4—4 of Fig. 3;

Fig. 5 is a full transverse, vertical section, taken on the line 5—5 of Fig. 3;

Fig. 6 is a detailed fragmentary horizontal section, on an enlarged scale, taken on the line 6—6 of Fig. 3;

Fig. 7 is a fragmentary enlarged, vertical section, corresponding to the upper right-hand part of Fig. 3;

Fig. 8 is a fragmentary enlarged vertical section of the forward end of the table, shown at the upper right-hand part of Fig. 3, and illustrates a modified structure;

Fig. 9 is a fragmentary section taken on the line 9—9 of Fig. 8;

Fig. 10 is a vertical, longitudinal, fragmentary section corresponding to a part of Fig. 7 and showing a modification of the mechanism; and Fig. 11 is a full top plan corresponding to Fig. 10.

The invention is directed primarily to the practically complete separation, according to commercial standards of intermixed divided or pulverulent materials, the parts or particles of which vary relatively very greatly in size while the materials vary very little in their specific gravities. An example of the kinds of materials cleaned is "run of the mine" bituminous coal, which is thoroughly cleaned without preliminary sizing, and solely by running the material as it comes from the mine, that is, fragments from, substantially 3 inches in size to the finest dust over a single cleaning table. The run of mine coal is intermixed with impurities including bony, rock, slate, sulphur and other materials, and the substantially perfect or complete separation of these impurities from the coal, especially in the dust and very small sizes, is exceedingly difficult.

The term "divided materials" refers broadly to any particulate, comminuted, pulverulent, granular or like material of the kind described. The terms "lighter" and "heavier" materials are used for the sake of brevity as applied to materials of relatively greater or less specific gravities.

The cleaning of intermixed materials of the kinds indicated, such as the "run of mine" bituminous coal referred to, is very different from, and much more difficult than, the separation or concentration of ores, such as ores of the precious metals. In the separation or concentration of ores, the entire mass of material is very finely pulverized, and thereby reduced to practically a uniform size, and the gangue on the one hand and the precious metals on the other hand vary very greatly in their relative specific gravities. In cleaning run of the mine coal, with the wide variation in sizes of the particles, and with the relatively close specific gravities of the different materials, and especially in view of the adherence of different materials (such as coal and bony) in single pieces, entirely different treatment of the materials is necessary to affect commercially complete separation, and the problem of separation is much more difficult.

The invention provides a process and means whereby the usual preliminary sizing, (that is, separation or gradation of the materials into a large number of sizes by screening), and the subsequent separation or cleaning of the various sizes upon a corresponding number of small separating tables, is obviated. It is usually customary to size the finer materials by differences of one-eighth or by one-quarter inch in dimensions, the dimensional variation of the sizing increasing upwardly. By this former system it is quite usual to have perhaps ten screens and ten cleaning tables to completely clean all sizes of ordinary run of the mine coal. By my invention, there is no preliminary screening and sizing, and the complete cleaning of the coal is effected by the use of a single table, the coal from the mine being fed to rear end of the table, and the clean coal being discharged from the forward part of the table into the railway cars.

My invention includes broadly the separation of lighter and heavier materials, that is, the coal from all impurities, by feeding to the rear end of an air-pervious, longitudinally reciprocated table, the intermixed materials, in regulated quantity, so that a bed of the materials of substantial thickness is maintained on all parts of the table, the bed gradually moving forwardly, meanwhile being progressively stratified horizontally, the clean coal forming a superior stratum, and the impurities, settling by gravity upon the air-pervious table. The settled impurities, while resting upon the table, are then forwarded by friction and inertia, and are gradually concentrated into a stream and discharged, preferably at the forward end of the table. The superior stratum of clean coal is discharged preferably laterally at either side forwardly of the table.

My invention is further and more particularly directed to effecting a final and ultimate separating action, designed to substantially completely separate the extreme fines of the coal from the extreme fines of the impurities. With this object in view I subject the separated stream of impurities to a further separating action, and do this preferably during the discharging movement of said stream. This is effected primarily by directing through the stream of impurities, for the full width thereof, a relatively thin blast of air, thereby to remove any possible residuum of the coal. According to an additional feature of the invention, I subject the fines removed from the stream of impurities by the blast of air to a still further separating operation, preferably by passing same over a small supplementary air-pervious deck. With certain kinds and conditions of material, this final separating action will not be necessary, but with other kinds and conditions of material, as for example highly bituminous coking coals, this final separation will be found useful in approaching the maximum of the theoretical washability curve of the particular coal.

It will be understood that the foregoing general statement of the invention and the following detailed description as well, are explanatory and exemplary of the invention, but are not restrictive thereof.

Referring now in detail to the embodiment of the invention illustrated by way of example in the accompanying drawings, an air-pervious table 1 is provided, which may be of a uniform degree of perviosity throughout its entire area, or which may be zoned or gradated as may be found desirable and efficient, preferably with the air perviosity decreasing forwardly and possibly also outwardly of the table. As embodied, the rear portion of the table 1 is relatively wide, and preferably of rectangular form, preferably for a fairly large proportion of the length of the table. The forward portion narrows gradually from said wide portion forwardly to the front end, which end is preferably relatively quite narrow. The invention is applied preferably to a process wherein a bed of the inter-mixed materials is maintained upon the table undergoing horizontal stratification and separation. Bed retaining walls are therefore provided about the rear end of the table, and accordingly the table is provided at the back end with a retaining wall 2, and also with side bed-retaining walls 3 and 4, at either side, which walls extend from the back wall 1 forwardly to the end of the full width of the table, as clearly shown in Fig. 2. The surface of the table is preferably provided with a plurality of separating partitions 6, which may vary both as to height and arrangement, but are shown arranged parallelly and longitudinally of the rear part of the table, and convergingly from the point at which the table begins to narrow toward the front end of the table.

The table is mounted so as to provide for longitudinal reciprocation thereof in a very short path, and the air-pervious deck 1 is mounted on a supporting frame, having two side members 15 and a plurality of cross members 16. This frame is pivotally supported at 17, upon the upper ends of a plurality of supporting arms 18, and the lower ends of these arms are pivotally supported at 19 upon frame members 20, which latter are mounted on the upper part of the side walls of a stationary air-chamber 21. There is a flexible air seal provided between the reciprocable air-pervious table 1 and the stationary air-chamber 21, and for this purpose they are connected throughout by a seal 22 of canvas or other flexible material, which maintains the airtight chamber while permitting the reciprocation of the table.

The illustrated form of means for reciprocating the table on the arms 18 comprises a connecting rod 25, pivotally connected at 26 to the rear end of the table, which rod at the other end is connected to an eccentric 27, fixed on a shaft 28, journalled in supports 29, mounted upon the air-conduit. The shaft 28 may be driven in any suitable manner, and is preferably provided with any standard form of variable speed drive. The stroke of the table is short and quick, and is preferably forwardly and upwardly and downwardly and backwardly.

Means are provided for feeding the intermixed materials to the rear end of the air-pervious deck 1, which may be of any known or suitable form, so as to maintain continuously upon the table a forwardly moving bed of the desired thickness progressively undergoing separation. In the embodied form, a hopper 33 is provided, discharging by a chute 34 onto the rear end of the table 1 and preferably substantially entirely there-across. The embodied feeding device 35 has a horizontal shaft 36, journaled in the hopper walls, upon which shaft are fixed a plurality of blades 37, which, by their rotation, regulate the discharge of the intermixed materials from the hopper 33. The device 35 is driven by any suitable means, but preferably by some form of variable speed drive.

In the operation of the table, the air currents forced up through the air-pervious deck primarily separate or loosen apart the particles of the intermixed materials, and facilitate the settling of particles of the heavier material by gravity upon the table, while the particles of the lighter material are held flotant, or are flotated upwardly, and gradually horizontal stratification and separation of the materials is effected as the bed progresses longitudinally of the table. The settled heavier materials is progressed forwardly along the table by friction and inertia due to the reciprocation of the table while the lighter material progresses in a flotant air buoyed stratum. In the rear part of the table the longitudinally disposed separating partitions direct the settled heavier material forwardly, and in the forward part of the table, where they converge forwardly they serve to direct the settled and progressing heavier material into a concentrated stream, and also participate in and insure the substantial completion of the separating action. The further process of ultimate separation applied by my present invention to the fines as a subsequent or supplemental operation, as hereinafter described, may be applied to or associated with other processes or mechanisms than those herein described for effecting the initial or main separation.

The superior stratum of clean coal begins to be discharged laterally from the table from about the point where the table begins to narrow, and the discharge continues practically to the forward end of the table, as will be clear from Figs. 1 and 2. There is provided at the two spillage edges for the coal vertical walls 40 and 41, respectively, which may be of any height especially adapted for the particular kind of coal upon which a table may be operating so that the upper edge of the spillage wall will be at the level of the bottom of the stratum of clean coal. These spillage walls preferably increase in height toward the forward end of the table, as will be seen from Figs. 3 and 7. Controlling means for the height of the bed at the front of the table and for the rate of discharge of the heavier material are likewise preferably provided, as will be later described and as shown in Fig. 8 of the drawings.

The embodied form of means for forcing the air current through the bed of materials upon the table 1 comprises any suitable source, such as a rotary fan 51, the air from which is delivered through a conduit 52 to the air chamber 21 beneath the table. As embodied, the air chamber has a medianly-positioned, horizontally-disposed deck 53, which forms an upper air chamber 50 beneath substantially the entire extent of the air-pervious deck 1, and a lower air chamber 49. In accordance with certain features of the invention, I preferably employ a pulsating air current, although this is not essential so far as concerns other features of my invention. The embodied form of means for creating the pulsating air current comprises a rotary butterfly valve 55 extending across the entrance end of the upper part of the stationary air chamber, this valve being fixed upon a horizontally-disposed shaft 56, journalled in the side walls of the air chamber. This shaft is driven by any suitable means, and at any desired speed, and preferably in a predetermined synchronous relation with the period of reciprocation of the table. As illustrated, the shaft is provided with a pulley 57, and a belt 58, but the driving means may be of any desired form for effecting the stated functions. Means are also provided for regulating the intensity of the air current directed to the air-pervious deck 1, and for this purpose a rearwardly-pointing, horizontally-disposed vane or deflecting plate 61 is pivotally mounted on a shaft 62 at the rear end of the air chamber partition floor 53. The shaft 62 is journalled in the side walls of the air chamber, and is provided on the exterior thereof with an actuating arm 64, and any kind of locking device 65, whereby the inclination of the deflecting plate 61 may be varied and controlled. By my invention, I provide for a further ultimate separation of any slight residuum of intermixture of materials. In certain kinds of coal the percentage of impurities in the "fines" or smaller particles is relatively very high, and the practically complete separation thereof is very difficult. The additional separative operation is directed in part to the first described purpose and in part to insure the separation of any residuum of coal from the concentrated stream of impurities. In applying the invention to the fines the table may be so adjusted or tuned that the still impure or questionable fines can be optionally discharged from the main table with the stream of impurities and can thus be subjected to the further separation.

Referring now to the embodied form of means for acting upon the concentrated stream of impurities so as to remove therefrom any residuum of coal, an air passage 71 is provided at the forward end of the table, the passage being so located and shaped as to discharge a relatively thin sheet of air, of varying, and if desired very great, intensity, and of the full width of the stream of discharged impurities, across said stream and preferably transversely upwardly. This is done preferably after the stream of impurities has been discharged from the main table. The air channel 71 is provided with a flexible air seal 72, constituting a communication into the lower part 74 of the stationary air chamber. This part of the air chamber has a horizontally-disposed partition floor 75, which is preferably provided at its rear end with an air current regulating vane 76, pivotally mounted on a horizontally-disposed shaft 77, mounted on the rear end of the horizontal partition 75. The shaft 77 is journalled in the side walls of the stationary air chamber and exteriorly thereof is provided with a positioning arm 79, which cooperates with suitable holding means 80, and thereby the force of the air current directed into the chamber 74 may be regulated. If desired, there may be an opening 83 between the upper chamber 50, which is beneath the table proper and the air blast chamber 74, and this may be entirely closed or opened to any desired extent by a sliding shutter 84, provided with a rack and pinion adjusting means 85, having an actuating crank 86 on the exterior of the air chamber.

The regulation of both the size and intensity of the air blast from the passage 71 is an exceedingly important feature of my invention, and preferably a plurality of devices for regulating the thickness or thinness of the sheet-like air blast, as well as the intensity thereof are provided. The vane 76 effects this result in so far as concerns the intensity. Further means for controlling the intensity of this air blast, however, may be provided if desired, and as embodied a shutter valve 91 is mounted on the vertical front wall 92 of the chamber 74, and is adapted to be moved to and fro to open and close the air passage 71 to any desired degree. For this purpose, it is provided with a rack and pinion movement 93, which has an actuating handle 94 exteriorly to the air chamber. Either or both of these devices may be used. For the purpose of regulating the thinness or thickness of the air blast substantially at the place where it impinges upon the stream of impurities, a shutter valve 98 (Fig. 7) is provided, which is adapted to be moved to and fro across the throat of the passage 71 and thereby to regulate the thickness or thinness of the impinging air blast. The shutter valve 98 is operated by a suitable mechanism, such as bolt and slot devices 99.

Means are provided for receiving the coal or other lighter material dislodged by the air blast from the stream of impurities, and said receiving means is preferably movable to and from the stream of impurities, and by such positional regulation to catch and thereby separate all of the coal separated by the air blast while permitting any separated finer particles of impurities to fall back and to be discharged with the stream of impurities. In the embodied form of said means illustrated in Figs. 1 to 7, a chute 105 is mounted on the forward end of the reciprocable table frame, and this may be inclined at any degree desired. To further effect and insure a clean separation, the rear end 106 of the chute 105 is pivotally mounted upon the chute at 107, and a bolt and slot connection 108 at either side serves to hold the part 106 at any desired angle, and therefore at any desired level with respect to the forward discharge end of the table 1. To further effect the described function, if desired, the rear end of the bottom of the pivoted portion 106 of the chute may be provided with a slidable plate 111, having a bolt and slot connection 112 with the floor of the chute 106. This plate 111 may be moved to and fro, to conform to the separating line between the separated coal and the stream of impurities, and between the separated coal and any dislodged impurities. Either the pivoted chute 106, or the sliding plate 111 may be used without the other, if desired.

The further discharge means for the impurities may be of any desired form, so far as concerns most features of the invention. As embodied, however, a receptacle 123 is provided in the forward stationary part of the structure, and this is provided preferably at the forward discharge end thereof with a pivoted gate 124, which may be weighted as desired to regulate the discharge of the impurities. The bottom of this chamber may be air-pervious if desired, as shown at 125, and a shutter 126 may be provided for shutting off the air current, if desired. Air is supplied to the pervious floor 125 through a passage 127, communicating with the main air chamber, as best shown in Fig. 3. An air controlling shutter valve 128 is preferably provided for the air passage 127; this may be operated by a rack and pinion movement 129, to vary or to entirely cut off the air current.

As previously indicated, with certain kinds of coal, as for example those with very dirty "fines", it may be desirable to apply an extra separating action to such fines. Where this is necessary or desirable, these fines can be optionally directed into the stream of impurities by the "tuning" of the table and the cross air blast may be so regulated both as to its intensity and area of impact on the stream of impurities so as to remove these impure "fines" for further treatment. This constitutes an optionally usuable separation process for certain kinds of dirty coal or the like. Accordingly additional means are likewise provided by my invention for effecting said optionally usuable further separation.

In accordance with one feature of my invention, I optionally provide a further air table separating action which may be employed as may be desired or necessary for certain kinds or conditions of materials, such as still dirty fines which might be removed from the stream of impurities by the air blast, either from the nature of the materials, or the intentional adjustment of the machine. An exemplary embodiment thereof is shown in Figs. 10 and 11 of the drawings. In this form the floor 137 of the chute 105 is air-pervious, though usually to a relatively less degree than the main table, and underneath the air-pervious floor 137 is an air chamber 138. The air chamber 138 communicates with the front end of the air chamber, through an opening 140, by means of a pipe 139, having a flexible and extensible portion 143. If it is desired to make the table 137 variably inclinable, this can be done by pivotally mounting it on a rod 141, mounted cross-wise near the front end of extensions 144 of the vibratable frame of the table. Bolt and slot connections 145 are provided between a side wall of table 137 and one of the frame pieces 144. The table 137 is shown provided with a plurality of separating partitions 147 forwardly and transversely disposed, although these may be arranged as desired. The separated impurities which settle upon the table 127 are directed to a channel 149, and into a passage 150, which may be provided with a pivoted and weighted gate 151, and discharged by a chute 154 into the rock conveyor. The separated fines of the coal are discharged over the spillage edge 152, and are directed backward through a chute 153, to the conveying means for the coal discharged from the table 1.

If desired, means may be provided for regulating the height or thickness of the bed at the forward end of the main table, and of the concentrated stream of impurites discharged from the front end of the table, and such a device is shown in Fig. 8 of the drawings. For this purpose a transverse slide 157 is mounted across the front end of the table and is vertically movable in guides 158 and 159, mounted at either side on the forward ends of the spillage walls 40 and 41. This slide 157 is maintained at the desired height above the table by any suitable means, such as pins 160, and thereby regulates the rate of discharge of the stream of impurities from the front of the table.

The spillage walls 40 and 41 may also be made variable in height if desired, and an embodiment of this feature is illustrated in Figs. 8 and 9. Therein the spillage walls have respectively, an outer member 163 which is connected with the spillage wall proper by a plurality of bolt and slot connections 164, whereby the height of the spillage wall throughout its length may be nicely regulated, and the relative inclination thereof be varied as desired.

From all the foregoing it will be understood that a process and mechanism has been provided realizing the objects and advantages hereinbefore set forth, together with other objects and advantages; and it will be obvious that departures may be made from the details of the exemplary disclosure without departing from the principles of the invention and without sacrificing its chief advantages.

What I claim is:

1. A mechanism for separating intermixed divided materials which vary relatively greatly in size but vary relatively little in their specific gravities including in combination an air pervious table, means for feeding to the rear of, and maintaining upon the table a bed of materials of substantial thickness, means for gradually moving forwardly and progressively separating the materials of the bed into horizontal strata including devices for forcing an air current through the bed and for longitudinally reciprocating the bed, cooperating devices for concentrating a separated and settled heavier material into a stream, discharging the stream of heavier material from the table, and means for directing a blast of air through the unsupported discharging stream to separate therefrom any residuum of a lighter material.

2. A mechanism for separating intermixed divided materials which vary relatively greatly in size but vary relatively little in their specific gravities including in combination an air pervious table, means for feeding to the rear of, and maintaining upon the table a bed of materials of substantial thickness, means for gradually moving forwardly and progressively separating the materials of the bed into horizontal strata including devices for forcing an air current through the bed and for longitudinally reciprocating the bed, cooperating devices for concentrating a separated and settled heavier material into a stream, devices for laterally discharging a superior stratum of lighter material, and for discharging the stream from the front end of the table, and means for directing a blast of air across and through the entire width of said concentrated stream of heavier material to separate therefrom any residuum of lighter material.

3. A mechanism for separating intermixed divided materials which vary relatively greatly in size but vary relatively little in their specific gravities which comprises means for separating the materials, means for discharging a heavier material in a substantially horizontal, concentrated stream, means for blowing a blast of air upwardly through said stream to separate therefrom any residuum of a lighter material.

4. A mechanism for separating intermixed divided materials which vary relatively greatly in size but vary relatively little in their specific gravities which comprises a vibratable, air-pervious table for separating the materials, means for discharging a heavier material in a concentrated stream, means for blowing a blast of air through said stream to separate therefrom any residuum of a lighter material, and means for receiving and further separating said separated part including a pervious table and means for forcing an air current therethrough.

5. A mechanism for separating intermixed divided materials which vary relatively greatly in size but vary relatively little in their specific gravities which comprises means for separating the materials, means for discharging a heavier material in a concentrated stream, means for blowing a blast of air through said stream to separate therefrom any residuum of a lighter material, means comprising a vibratable, air-pervious table for receiving and further separating said separated part, and devices for variably positioning said receiving means with respect to said stream of heavier material.

6. The process of separating intermixed divided materials which vary relatively greatly in size but vary relatively little in their specific gravities which comprises subjecting a bed of the intermixed materials, supported on an air-pervious support, to the stratifying and separating action of lifting air currents and mechanical vibration, discharging the lighter material as a superior flotant stratum, progressing the settled heavier material transversely beneath said flotant stratum to discharge, impelling the separated heavier material from the support and subjecting the moving and unsupported heavier material to a lifting air blast to separate therefrom any residuum of a lighter material.

7. The process of separating intermixed divided materials which vary relatively greatly in size but vary relatively little in their specific gravities which comprises subjecting a bed of the intermixed materials, supported on an air-pervious support, to the stratifying and separating action of lifting air currents and mechanical vibration, discharging the lighter material as a superior flotant stratum, progressing the settled heavier material transversely beneath said flotant stratum to discharge, impelling the separated heavier material substantially horizontally from the support, directing an air blast upwardly through the horizontally moving and unsupported stream of heavier material to overcome the action of gravity on any residuum of lighter material therein and thereby permitting said lighter material to continue its horizontal movement, while the heavier material falls against said upward blast, and separately collecting the separated lighter residuum.

8. The process of separating intermixed divided materials which vary relatively greatly in size but vary relatively little in their specific gravities which comprises subjecting a bed of the intermixed materials, supported on an air-pervious support, to the stratifying and separating action of lifting air currents and mechanical vibration, discharging the lighter material as a superior flotant stratum, progressing the settled heavier material transversely beneath said flotant stratum to discharge, impelling the separated heavier material substantially horizontally from the support, directing an air blast upwardly through the horizontally moving and unsupported stream of heavier material to overcome the action of gravity on any residuum of lighter material therein and thereby permitting said lighter material to continue its horizontal movement, while the heavier material falls against said upward blast, and separately collecting the separated lighter residuum and controlling the action of the air blast to avoid concurrent separation of the heavier material.

9. The process of separating intermixed divided materials which vary relatively greatly in size but vary relatively little in their specific gravities which comprises subjecting a bed of the intermixed materials, supported on an air-pervious support, to the stratifying and separating action of lifting air currents and mechanical vibration, discharging the lighter material as a superior flotant stratum, progressing the settled heavier material transversely beneath said flotant stratum to discharge, intermittently impelling the separated heavier material from the support and subjecting the moving and unsupported heavier material to a lifting air blast to separate therefrom any residuum of a lighter material.

10. The process of separating intermixed divided materials which vary relatively greatly in size but vary relatively little in their specific gravities which comprises subjecting a bed of the intermixed materials, supported on an air-pervious support, to the stratifying and separating action of lifting air currents and mechanical vibration, discharging the lighter material as a superior flotant stratum, progressing the settled heavier material transversely beneath said flotant stratum to discharge, intermittently impelling the separated heavier material substantially horizontally from the support, directing an air blast upwardly through the horizontally moving and unsupported stream of heavier material to overcome the action of gravity on any residum of lighter material therein and thereby permitting said lighter material to continue its horizontal movement, while the heavier material falls against said upward blast, and separately collecting the separated lighter residuum.

11. The process of separating intermixed divided materials which vary relatively greatly in size but vary relatively little in their specific gravities which comprises separating the intermixed materials by the action of lifting air currents and mechanical vibration, thereafter subjecting an unsupported stream of heavier separated material to a blast of air to remove residual lighter particles therefrom, and subjecting said lighter particles to a further separating action.

12. The process of separating intermixed divided materials which vary relatively greatly in size but vary relatively little in their specific gravities which comprises separating the intermixed materials, discharging a heavier separated material from a support, and thereafter subjecting said unsupported and moving heavier material to a blast of air to separate a residuum of fine particles therefrom, and subjecting said separated fine particles to a further separating action.

13. The process of separating intermixed divided materials which vary relatively greatly in size but vary relatively little in their specific gravities which comprise separating the intermixed materials, discharging a heavier separated material from a support, and thereafter subjecting said unsupported and moving heavier material to a blast of air to separate a residuum of fine particles therefrom, and subjecting said separated fine particles to a further separating action including lifting air currents and mechanical vibration.

14. A mechanism for separating intermixed divided materials varying relatively greatly in size and relatively little in their specific gravities including in combination two reciprocable air-pervious tables separated by a relatively narrow air gap, means for effecting a primary and major separation of the materials on the first table, means for impelling a separated stratum of material across the air gap, means for subjecting said unsupported stratum to an upwardly directed air blast to blow out and sustain light and fine particles thereof while permitting large and heavy particles to fall through the gap, and means for subjecting the separated fine particles to a secondary separating action on the second table.

15. A mechanism for separating intermixed divided materials varying relatively greatly in size and relatively little in their specific gravities including in combination two reciprocable air-pervious tables separated by a relatively narrow air gap, means for effecting a primary and major separation of the materials on the first table, means for impelling a separated stratum of material across the air gap, means for subjecting said unsupported stratum to an upwardly directed air blast to blow out and sustain light and fine particles thereof while permitting large and heavy particles to fall through the gap, and means for subjecting the separated fine particles to a secondary separating action on the second table and means for separately discharging the heavier material which falls through the gap.

In testimony whereof, I have signed my name to this specification.

RICHARD PEALE.